: 3,260,547
Patented July 12, 1966

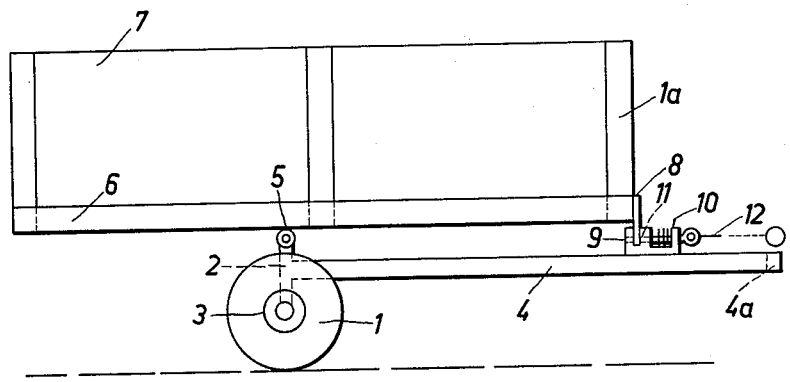
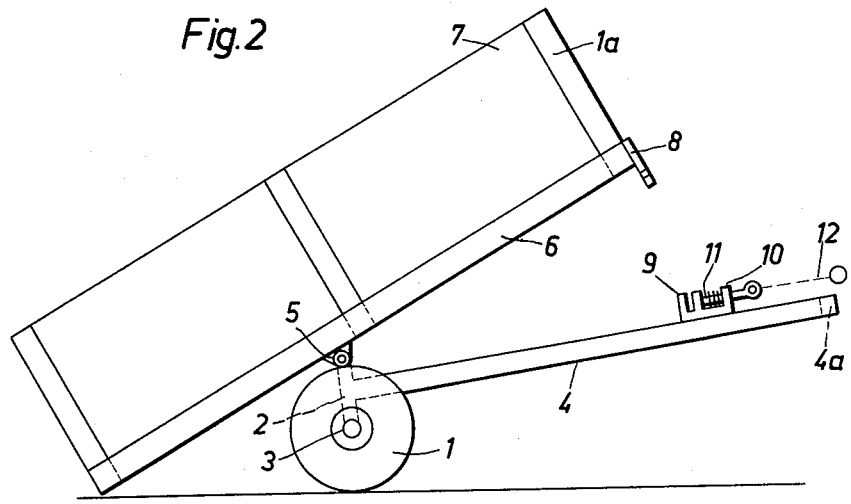

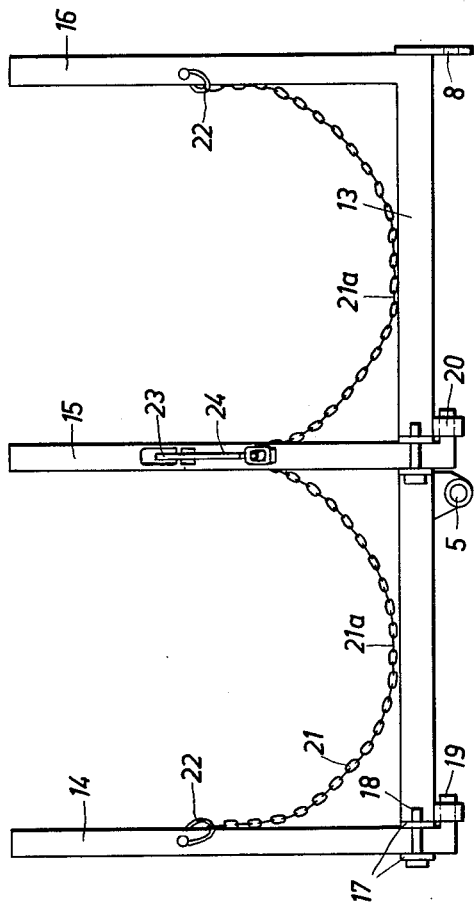

1

3,260,547
TRAILER HAVING TILTING BODY ADAPTED
FOR FOREST USE
Alfred Heilig, Singen, Hohentwiel, and Otto Jäckle, Singen, Germany, assignors to Andreas Stihl Maschinenfabrik, Neustadt, Waiblingen, Germany
Filed July 8, 1963, Ser. No. 293,531
3 Claims. (Cl. 298—5)

The invention concerns a trailer for forest use of the kind employed for the transport especially of wood. Such trailers consist of two wheels arranged on an axle, and may be coupled up with a tractor vehicle by means of a tow coupling fixed to a shaft, and have a supporting frame on which body structures are arranged.

It is the object of the invention to make available a trailer for forest use which is particularly suitable for the transport of stacked wood from the place of felling to the final user. The trailer is to be simple in design and is to ensure the efficient transport of wood and rapid stacking of the wood to the required volume.

In a trailer for forest use for the loading and discharging of sawed timber and long timber, which is provided with two wheels arranged on an axle and may be coupled up with a tractor vehicle by means of a tow coupling fixed to a shaft, at least two U-shaped holding frames arranged at a distance with respect to each other are provided as body structures according to the invention, and these U-shaped holding frames circumscribe a given stacked measure as wood-loading space; at the same time these frames may be tilted about a horizontal axis arranged above the wheel axle in such a way, that during the tilting the fitted wood is automatically discharged. This arrangement has the advantage of the wood being stacked to the required volume without any separate measuring process as soon as it is loaded into the trailer. Moreover the U-shaped holding frames may be tilted in simple manner when the contents of the trailer is discharged so that the wood drops out automatically. Naturally the wood which is loaded in the trailer and takes up a given stacked measure may be bundled before discarge with the aid of wires or suchlike and then discharged as a fixed volume of quantity.

According to another feature of the invention the lateral parts of the U-shaped holding frames are connected to the lower frame forming the floor in a detachable manner, and chains sagging in a semi-circle are provided between two holding frames for the loading of wood. Experience has shown that, using the trailer as described above, two laborers can handle one cubic metre of wood within four minutes whereas, under the same conditions of work, three laborers require 10 minutes with the method as used hitherto. It is thus seen that a saving in working hours of 70% is achieved. Again, if wood is transported by dragging—a method of transport which is used particularly for weak types of long wood such as thin trunks or long pitwood and where this long wood is bundled by means of a chain and dragged away from the place of felling—the use of the trailer according to the invention constitutes a considerable advantage. The long wood is placed with the thick end of the trunks on the trailer and then transported by dragging the thin end of the trunks. For this purpose the U-shaped holding frames may be provided with spikes and any sliping-out of the trunks during transport is thus avoided, especially since the trunks, according to another suggestion made in the invention, are firmly gripped in the U-shaped holding frames by means of a special gripping device taking the form, for example, of a chain and a tension clamp. Furthermore the forest paths are not damaged when this method is employed for transport by dragging, and any fouling of the wood that has been dragged over the forest ground, is definitely precluded.

A particularly useful embodiment of the trailer for forest use is obtained by arranging two or more U-shaped holding frames on a chassis side-by-side, thus forming a platform body. In this version it is expedient for the tilting shaft to be arranged between the platform body and the chassis and, by at least a short distance, behind the center of gravity of the platform body; preferably a sackle is provided at the front end of the platform body, which hooks into a catch device, arranged on the shaft, in a detachable manner. This trailer is used, for example, for the loading of different and separate stacked measures of wood. The trailer is particularly suitable if the wood is to be loaded in such a way that various grades are kept separate. To discharge the wood, the individual holding frames which are connected to the supporting frame in a detachable manner, are released, the trailer is tilted about the horizontal axis and the catch device is released so that the fitted volume of wood which is either loose of bundled, for example by means of steel straps, slides off. It is thus seen that the wood may be sorted and bundled ready for sale at the place of felling, thereby rendering sorting at a later stage, as customary hitherto, superfluous.

A detailed description of the invention is given below with reference to the drawings in which:

FIG. 1 is a schematic side-view of a trailer having two holding frames arranged side-by-side, in travelling position, FIG. 2 shows the trailer according to FIG. 1 in tilted position, FIG. 3 shows in greater detail than FIG. 1 the loading platform body structure according to FIG. 1 with three upright frames, FIG. 4 is a partial front view of the central upright frame according to FIG. 3.

The trailer according to the invention may be used for the following applications:

The procedure customary at present is to transport wood by means of a box-type trailer or suchlike to discharge it at the place of loading and—if loading by means of grabs is envisaged—to arrange the wood in annular stacks having a certain area, and to bundle it so that each bundle represents an amount such as some known multiple and/or fraction of a chord. According to the invention the wood is loaded, bundled on the trailer and may then be tipped off at the place of loading as a ready bundle of some amount such as some known multiple and/or fraction of a chord.

The dragging of long wood according to the customary method using chains will inevitably damage the paths of dragging; moreover, only a proportion of the quantity may be dragged under those circumstances as compared with the loading capacity offered by the trailer, i.e., where the thick ends of the long wood are placed into the holding frames and held tight there. Thereafter the front end of the trailer may be forced down, by means of the lifting device, in such a way that the thin ends of the wood are not dragging along the path but are suspended freely in the air so that any damage to the paths is definitely precluded. Another advantage in this operation is to be seen in the fact that bundles of long wood, held fast in such a way on the trailer according to the invention, may be sawed up very rapidly. At the place of loading a suitably dimensioned saw-horse is placed under that end of the long-wood bundle which is lifted by the lifting device, while the trailer itself is used, so-to-speak, as a counter-horse. In this way the bundle is cut to length from the thin trunk ends right up to the holding frames; at the same time, moreover, the last part of the bundle, which is still left on the trailer, is automatically measured, too.

In all the operations described above the invention results in the time required being reduced to about half of the normal time. It goes without saying that, for example, two of these trailers may be coupled up and used as a two-axle vehicle for the transport of heavy-type long wood or suchlike. The embodiment described and shown in the drawing may, of course, be modified in various ways, but this does not affect the basic idea of the invention and is not, therefore, required to be discussed here.

With reference to the trailer running on two wheels 1 has, as a chassis, a low vertical frame 2 which supports the wheel axle 3 and the shaft 4 and the top edge of which takes the form of a joint 5. The floor 6 of the loading-platform body 7 is fixed to this joint in such a way that the center of gravity of the body is at a point a little distance in front of the joint, i.e. over the shaft 4.

The shaft 4 is provided with a trailer coupling 4a and has, below the front edge of the loading-platform body 7, a catch device which, in the travelling position of the trailer, engages a shackle 8, which latter is rigidly attached to the front edge of the body floor 6 and is provided with an appropriate eye or suchlike. In the example shown, the catch device consists of a U-piece 9 which accommodates the shackle 8; the U-piece is supplemented by a spring bolt 11 which moves in an additional guide 10. Thus in the closed position the bolt penetrates through the U-piece 9 and the eye of the shackle 8, and is retained in this position, in which the loading-platform body is fixed, by its spring.

If the bolt 11 is pulled and the force of its spring overcome, it releases the shackle 8 and at the same time the loading-platform body 6, 7, which may then be tilted about its joint 5.

The tipping process takes place as follows: The loading-platform body 6, 7, after its rear end has been opened and is ready for tipping out the load, is lifted via the shaft 4, 5 by means of the lifting device of the towing vehicle, the catch device 8 to 11 being released simultaneously. The lifting results in the load's center of gravity being shifted, so that the load begins to slip a little, behind the joint 5, whereupon the body is tilted completely and is emptied entirely by moving the trailer forward. The catch device may be released from the towing vehicle by means of a control cable 12, which is hooked into the bolt 11.

The trailer according to the invention as described above may be used for practically all types of bulk material, particularly in agriculture. When employed for forest use it is advisable to have a special design of the loading platform body as illustrated in FIGS. 3 and 4. In this case the floor of the body consists of a stable supporting frame 13 which, in the example shown, is provided with three pairs of upright frames 14, 15, 16, between which stacked wood, for example, is placed. The two rear pairs of upright frames 14, 15 at least are connected to the floor frame 13 in a detachable manner while the front pair of upright frames may be connected rigidly to the floor frame. The detachable upright frames 14, 15 have, at their lower end, an angular connecting piece 19, which is inserted into an eye 20 fixed to the frame, thus enabling the upright frames to be moved to the vertical position where they are held between two shackles 17 which are rigidly fixed to the floor frame. The outer ends of the shackles protrude somewhat over the upright frames when the latter are in the vertical position, and they each have an eye through which a bolt 18 is pushed, thus holding the upright frames firmly in their vertical position. About half-way up the upright frames, eyes 22 are provided, into which a chain 21 is hooked which just touches the floor of the platform body 13 when it sags through. Transversely to the direction of travel, stacked wood may now be placed onto the chains between the upright frames, the dimensions being selected in such a way that the stacked wood, when loaded right up to the top ends of the upright frames, represents a given stacked measure such as some known multiple and/or fraction of a chord. This load of stacked wood may then be bundled in the manner already known (for example by means of steel straps) so that two bundles of wood may be transported on the trailer. To tip out the bundles of wood, the two rear upright frames 14, 15 are flapped down or entirely removed from the floor frame; a slight tilting of the trailer will then be sufficient to cause the bundles to slip a little whereupon the platform body, after releasing the catch device 8 to 11, is tilted up about its axle 5.

Experience has shown that after the transport of bundled wood, the chain 21 usually gets jammed and thus prevents the flapping down of the upright frames 14, 15; it is therefore advisable to provide, on the central upright frame 15, a tension device 23 whose tension lever 24 is, in the loading position, retained by a ring linked to the upright frame 15. A great variety of such tension levers are known and in use on trucks. On arrival at the destination, the tension lever 24 is released whereupon the chain falls out of the device and down, thereby in turn releasing the upright frames 14, 15.

To preclude the chain complicating the loading process by moving about, particularly while filling the lower part of the loading space is circumscribed by the chain 21, it is advisable to provide a hook or suchlike which connects the chain at its lowest point 21a to the floor of the platform body 13 in a detachable manner. This connection may also be rigid but in that case one has to put up with the chain remaining in the platform body at all times.

Further details concerning the purely mechanical execution of the trailer according to the invention are left to the discretion of the expert and it is therefore unnecessary to deal with this at any length in this description.

What is claimed is:

1. In a trailer vehicle for conveying timber and adapted for attachment to a tractor, a wheel supported axle, a frame carried by said axle, a shaft fixed to said frame and extending forwardly for connection to a tractor, a timber supporting body structure having a floor transversely pivoted to said frame above said axle and rearwardly of the center of said body structure, a fastening device on said shaft engaging a cooperating fastener on the forward end of said body structure to hold said floor horizontal, pairs of spaced uprights spaced longitudinally of said body structure with uprights of each pair connected to opposite sides of said floor, the uprights to the rear of the forward uprights being pivotally connected to said floor so that they may be swung out of vertical position to allow the timber to move rearwardly, said body structure being adapted to be tilted rearwardly to unload the timber by raising said shaft by a lifting mechanism on said tractor to shift the center of gravity rearwardly to substantially adjacent a vertical plane through the pivital axis for said floor and tilt said body structure about its horizontal axis, so that said timber may be released to discharge rearwardly from said floor when said uprights are pivoted out of the vertical position.

2. In a trailer vehicle as defined in claim 1, chains extending between the uprights on each side of said floor to support and confine the timber extending between the uprights on opposite sides.

3. A trailer vehicle as defined in claim 1, in which each of said uprights is pivoted on a longitudinal axis, so as to be pivotable laterally of said body structure to discharge said timber, and which includes a latch to secure each of said uprights in vertical position.

(References on following page)

References Cited by the Examiner

UNITED STATES PATENTS

| | | | |
|---|---|---|---|
| 283,262 | 8/1883 | Leonhardt | 298—5 |
| 948,159 | 2/1910 | Brown. | |
| 1,319,986 | 10/1919 | Beatty | 298—9 |
| 2,491,030 | 12/1949 | Budreau. | |
| 2,518,974 | 8/1950 | Busenius. | |

FOREIGN PATENTS

| | | |
|---|---|---|
| 1,273,015 | 8/1961 | France. |
| 872,740 | 4/1953 | Germany. |
| 138,109 | 3/1962 | U.S.S.R. |
| 139,941 | 3/1962 | U.S.S.R. |

OTHER REFERENCES

German printed application Ketter 1,100,483, Feb. 23, 1961.

BENJAMIN HERSH, *Primary Examiner.*

R. DAVID BLAKESLEE, ARTHUR L. LA POINT, *Examiners.*

R. J. JOHNSON, *Assistant Examiner.*